US008820996B2

(12) United States Patent
Aiki et al.

(10) Patent No.: US 8,820,996 B2
(45) Date of Patent: Sep. 2, 2014

(54) ILLUMINATION OPTICAL DEVICE AND VIRTUAL IMAGE DISPLAY

(75) Inventors: Kazuma Aiki, Tokyo (JP); Satoshi Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 362 days.

(21) Appl. No.: 12/509,718

(22) Filed: Jul. 27, 2009

(65) Prior Publication Data
US 2010/0027289 A1 Feb. 4, 2010

(30) Foreign Application Priority Data

Aug. 1, 2008 (JP) ................. 2008-200154

(51) Int. Cl.
*A47F 3/00* (2006.01)
(52) U.S. Cl.
USPC ........... 362/561; 362/551; 362/555; 362/558; 362/559; 362/615; 362/583; 349/61; 349/62; 349/64
(58) Field of Classification Search
USPC ......... 362/551, 555, 558, 559, 561, 556, 583, 362/97.2, 276; 349/61, 62, 64
See application file for complete search history.

(56) References Cited

U.S. PATENT DOCUMENTS

| | | | | |
|---|---|---|---|---|
| 5,005,954 A | * | 4/1991 | Liu | 359/107 |
| 6,710,909 B2 | * | 3/2004 | Naito | 359/291 |
| 7,196,789 B2 | * | 3/2007 | Senturia et al. | 356/323 |
| 7,196,849 B2 | * | 3/2007 | McGuire et al. | 359/630 |
| 2002/0003508 A1 | * | 1/2002 | Schehrer et al. | 345/7 |
| 2002/0164108 A1 | * | 11/2002 | Mendlovic et al. | 385/15 |
| 2002/0176151 A1 | * | 11/2002 | Moon et al. | 359/298 |
| 2003/0086135 A1 | * | 5/2003 | Takeyama | 359/13 |
| 2006/0285038 A1 | * | 12/2006 | Uchida et al. | 349/117 |
| 2010/0157577 A1 | * | 6/2010 | Montgomery et al. | 362/97.2 |

FOREIGN PATENT DOCUMENTS

| | | |
|---|---|---|
| JP | 200712530 | 1/2007 |
| JP | 2007-033669 | 2/2007 |
| JP | 2007-065080 | * 3/2007 |

OTHER PUBLICATIONS

Japanese Office Action for corresponding JP 2008-200154 issued on May 11, 2010.

* cited by examiner

*Primary Examiner* — Robert May
*Assistant Examiner* — Tsion Tumebo
(74) *Attorney, Agent, or Firm* — K&L Gates LLP

(57) ABSTRACT

An illumination optical device includes a light source, a light pipe guiding illumination light from the light source, a diffuser arranged on an emitting surface side of the light pipe. A width of the emitting surface of the light pipe in the horizontal direction is set greater than a width of an illuminated object, and a width of the emitting surface of the light pipe in the vertical direction is set smaller than a width of the illuminated object.

13 Claims, 12 Drawing Sheets

ILLUMINATION OPTICAL DEVICE AND VIRTUAL IMAGE DISPLAY

CROSS REFERENCES TO RELATED APPLICATIONS

The present application claims priority to Japanese Priority Patent Application JP 2008-200154 filed in the Japan Patent Office on Aug. 1, 2008, the entire content of which is hereby incorporated by reference.

BACKGROUND

The present application relates to an illumination optical device used to illuminate a spatial light modulator in an image display and to a virtual image display including the illumination optical device serving as an illumination optical system.

Some virtual image displays proposed in the past are designed to display to a viewer a virtual image formed by magnifying a two-dimensional image with a virtual image display optical system. For instance, Japanese Unexamined Patent Application Publication No. 2007-12530 proposes a virtual image display allowing a viewer to observe an image as a virtual image by repeatedly propagating image light obtained in a spatial light modulator while totally reflecting the image light within a light guide plate.

FIG. 16 shows an example of the virtual image display disclosed in the publication. This virtual image display 100, as shown in a schematic plan view of FIG. 16A and a schematic side view of FIG. 16B, includes an illumination optical system 101, a spatial light modulator 102 displaying images with illumination light, and a virtual image display optical system 103.

The illumination optical system 101 includes a light source 104, a tapered light pipe 105, a lens unit 106 with two linear Fresnel lenses 106A and 106B, a diffuser 107, and a polarizing beam splitter 108. In the illumination optical system 101, illumination light from the light source 104 is repeatedly undergone total reflection within the light pipe 105, emitted therefrom and enters the spatial light modulator 102 after passing through the two Fresnel lenses 106A, 106B, diffuser 107 and polarizing beam splitter 108. The light source 104 may be, for example, a light-emitting diode (LED). The spatial light modulator 102 may be a reflective spatial light modulator, more concretely, a reflective liquid crystal panel.

The linear Fresnel lenses 106A and 106B are arranged so that their optical powers are oriented perpendicular to each other and have different optical powers (i.e., focal lengths) from each other. The optical lens unit 106, composed of the linear Fresnel lenses 106A and 106B, varies its diffusibility according to the directions of the optical power. The diffuser 107 delivers higher diffusibility to light in the directions in which optical power is higher. The optical property of the Fresnel lenses 106A and 106B and the diffusibility of the diffuser 107 adjust the exit angle and the numerical aperture (NA) of the illumination light, and then the adjusted illumination light exits the diffuser 107 to enter the polarizing beam splitter 108.

The polarizing beam splitter 108 having received the illumination light reflects only an S-polarized component, for example, to illuminate the reflective spatial light modulator 102. The reflective spatial light modulator 102 modulates the S-polarized component light into image light according to an image. Then the image light is reflected off and passes through the polarizing beam splitter 108 to enter the virtual image display optical system 103.

The virtual image display optical system 103 includes a collimating optical system 110, a thin flat light guide plate 112, a first reflective volume holographic grating 113 and a second reflective volume holographic grating 114. The first reflective volume holographic grating 113 is placed on one end of an optical surface (back face) 116 of the light guide plate 112, the end being opposed to the collimating optical system 110. The second reflective volume holographic grating 114 is placed on the other end of an optical surface (back face) 116 of the light guide plate 112, the end being opposed to a viewer's pupil 117.

The image light is converted by the collimating optical system 110 into groups of parallel rays, which are in turn incident in the light guide plate 112 through one end of the optical surface 115, are diffracted and reflected by the first reflective volume holographic grating 113 and travel toward the other end while repeatedly undergoing total internal reflection within the light guide plate 112. The image light having reached the other end of the light guide plate 112 is diffracted and reflected by the second reflective volume holographic grating 114 and exits from the optical surface 115 to enter the viewer's pupil 117. Through this process, the image obtained at the spatial light modulator 102 in the virtual image display 100 can be viewed as a magnified virtual image formed by the virtual image display optical system 103.

SUMMARY

In the above-described virtual image display 100 in which the image light is propagated while repeatedly undergoing total internal reflection within the light guide plate 112, the angle of the chief ray of the illumination light from the collimating optical system 110 in the X-direction is set almost perpendicular, in other words, telecentric to the spatial light modulator 102. However, the angle of the chief ray in the Y-direction is not perpendicular to the spatial light modulator 102. The X-direction denotes a direction in which light is propagated within the light guide plate 112, while the Y-direction denotes a direction perpendicular to the propagation direction of the light guide plate 112. The illumination light exhibits a strong asymmetric property between the X-direction and Y-direction with respect to the light guide plate 112. Especially, since it is necessary for the intended range to be illuminated with the illumination light having a wide angle in the Y-direction, the diffuser 112 in use has to be set to have a large light-diffusion angle; however, the small NA (numerical aperture) necessary for the Y-direction reduces illumination efficiency. If the light-diffusion angle is set small, peripheral brightness is sacrificed for an improvement of illumination efficiency.

In view of the above problems, according to an embodiment, there is provided an illumination optical device that efficiently produces asymmetric illumination light and increases illumination efficiency without reduction of peripheral brightness, and a virtual image display including the illumination optical device as an illumination optical system.

The illumination optical device according to an embodiment includes a light source, a light pipe guiding illumination light from the light source and a diffuser arranged on an emitting surface side of the light pipe. In addition, the light pipe, according to the embodiment, has the emitting surface whose width in the horizontal direction is greater than a width of an illuminated object and whose width in the vertical direction is smaller than a width of the illuminated object.

The illumination device, according to an embodiment, adopts a light pipe having an emitting surface whose width in the horizontal direction is greater than the width of an illuminated object, thereby realizing a uniform angular distribution of the rays at any positions on the illuminated object in the horizontal direction. In addition, making the width of the emitting surface of the light pipe in the vertical direction smaller than the width of the illuminated object in the vertical direction provides a distribution in which the rays are angled so as to shift away from the center in proportion to the position on the illuminated object. Consequently, illumination light having anisotropic properties between the horizontal direction and vertical direction is produced.

The virtual image display, according to an embodiment, includes a light source, a light pipe guiding illumination light from the light source, a diffuser arranged on an emitting surface side of the light pipe, a spatial light modulator modulating the illumination light incident from the diffuser according to an image to produce image light, a collimating optical system converting the image light from the spatial light modulator into groups of parallel rays and emitting the rays, and a light guide plate in which the groups of the parallel rays enter and are propagated while repeatedly undergoing total internal reflection. Furthermore, the light pipe, according to an embodiment, has an emitting surface whose width in the horizontal direction is greater than the width of the spatial light modulator and whose width in the vertical direction is smaller than the width of the spatial light modulator.

The virtual image display according to an embodiment adopts a light pipe, in the illumination optical system, having an emitting surface whose width in the horizontal direction is greater than the width of a spatial light modulator and whose width in the vertical direction is smaller than the width of the spatial light modulator, thereby realizing a uniform angular distribution of the rays at any positions on the spatial light modulator in the horizontal direction. In addition, making the width of the emitting surface of the light pipe in the vertical direction smaller than the width of the spatial light modulator in the vertical direction provides a distribution in which the rays are angled so as to shift away from the center according to the position on the spatial light modulator. Consequently, illumination light having anisotropic properties between the horizontal direction and vertical direction is produced.

The illumination optical device according to an embodiment can efficiently produce asymmetric illumination light and can improve illumination efficiency without reduction of peripheral brightness.

The virtual image display according to an embodiment includes an illumination optical system capable of efficiently producing asymmetric illumination light and improving illumination efficiency without reduction of peripheral brightness.

Additional features and advantages are described herein, and will be apparent from the following Detailed Description and the figures.

BRIEF DESCRIPTION OF THE FIGURES

FIG. 6A is a diagram to illustrate rays from an exit pupil, obtained by a reverse ray trace in the X-direction, while

DETAILED DESCRIPTION

[Structure of the Embodiment]

The present application will be described below with reference to the drawings according to an embodiment.

Figure 1:
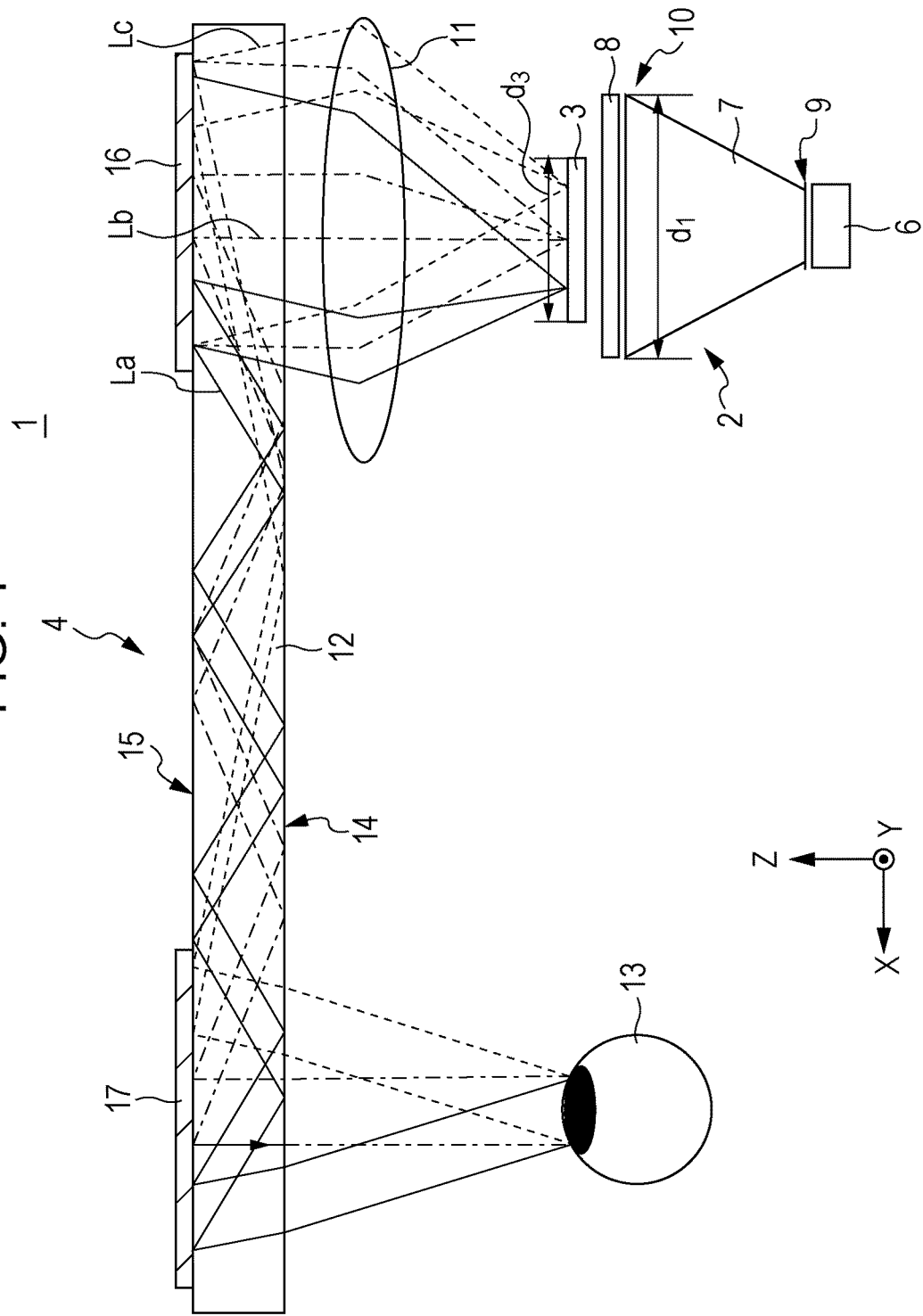
FIG. 1 is a schematic plan view showing the structure of a virtual image display as an embodiment according an embodiment.
Figure 2:
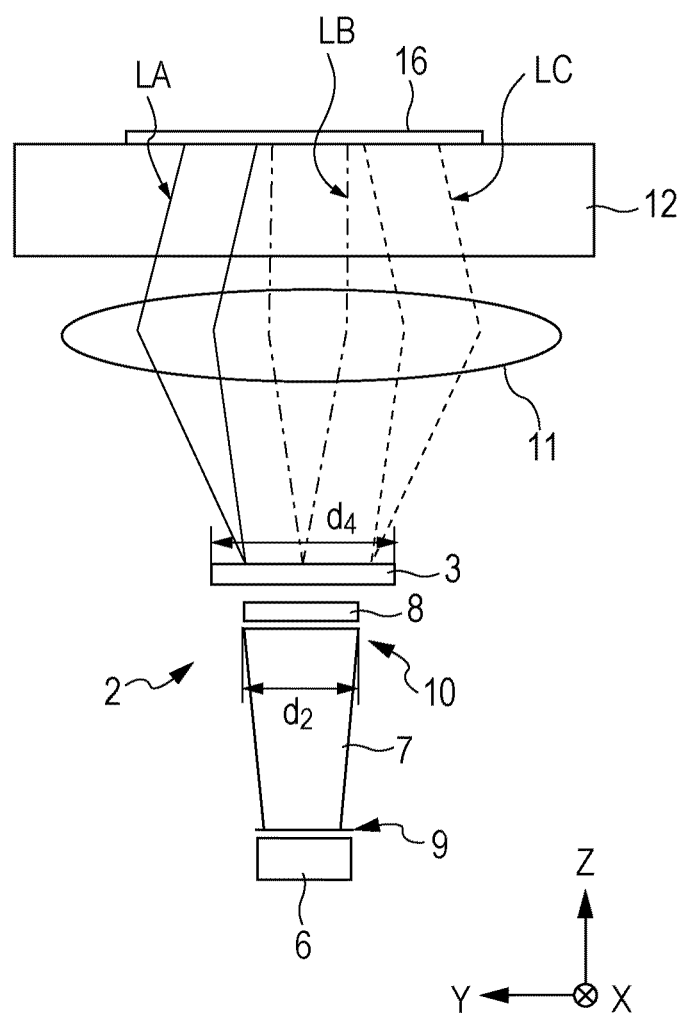
FIG. 2 is a schematic side view showing the structure of the virtual image display as an embodiment.

FIGS. 1 and 2 show a virtual image display as an embodiment. FIG. 1 is a plan view showing main components of the virtual image display according to the embodiment. In FIG. 1, a pupil of a viewer is watching the virtual image display. FIG. 2 is a side view showing the same components. Through FIGS. 1 to 2 is shown a common XYZ coordinate system defining: the right-left (horizontal) direction with respect to the viewer's pupil as X-direction; the up-down (vertical) direction as Y-direction; and the depth direction as Z-direction.

As shown in FIGS. 1 and 2, the virtual image display 1 according to the embodiment includes an illumination optical device (hereinafter, referred to as "illumination optical system") 2, a spatial light modulator 3, and a virtual image display optical system 4. The illumination optical system 2 emits illumination light to the spatial light modulator 3 where the illumination light is modulated according to an image to obtain image light. In this embodiment, the spatial light modulator 3 is a transmissive spatial light modulator, or, for example, a transmissive liquid crystal panel.

The illumination optical system 2 includes a light source 6, a light pipe 7 to which illumination light from the light source 6 is incident, and a diffuser 8 arranged on a side of an emitting surface 10 of the light pipe 7. The light source 6 can be, for example, a light-emitting diode (LED). The light pipe 7 is formed so that the cross-sectional area thereof increases from an incident surface (i.e., an opening where the light comes in) 9 opposed or adjacent to the light source 6 toward the emitting surface (i.e., an opening where the light goes out) 10 opposed or adjacent to the diffuser 8, and in other words, the light pipe 7, as a whole, is formed into a so-called tapered shape. In addition, the light pipe 7 is so designed that the width d1 of the emitting surface 10 in the horizontal direction is greater than the width d3 (in the horizontal) of the spatial light modulator 3 and the width d2 of the emitting surface 10 in the vertical direction is smaller than the width d4 (in the vertical direction) of the spatial light modulator 3. Although, a 4:3 or 16:9 rectangular modulator is generally used as the spatial light modulator 3, a quadrilateral modulator with other aspect ratio is also available.

The diffuser 8 is to diffuse the incident rays so as to spread from the center of the incident rays to exhibit a Gaussian distribution, and therefore is designed to adjust the exit angle and numerical aperture (NA) based on the incident light distribution. The diffuser 8 is the same in size and shape as the emitting surface 10 of the light pipe 7, or has a larger area than that of the emitting surface 10 of the light pipe 7.

The spatial light modulator 3 is disposed next to the diffuser 8 with a predetermined space therebetween. The spatial light modulator 3 disposed very close to the diffuser 8 may allow the pattern on the diffuser 8 to be seen, and therefore a space large enough to prevent the pattern of the diffuser 8 from being seen is necessary between the spatial light modulator 3 and the diffuser 8.

The virtual image display optical system 4 includes a collimating optical system 11, such as a finder optical system, and a light guide plate 12 having a hologram structure. The collimating optical system 11 receives image light from the spatial light modulator 3 and emits it as groups of parallel rays to the light guide plate 12, each group of the parallel rays having a different angle of view. The light guide plate 12 is a thin flat plate and includes optical surfaces 14 and 15 which are opposed to each other in the depth direction as viewed from the viewer's pupil 13.

The optical surface 14, which is one surface of the light guide plate 12, faces the pupil 13 and collimating optical system 11. On the optical surface 15, which is the other surface of the light guide plate 12, placed are a first reflective volume holographic grating 16 at one end opposed to the collimating optical system 11 and a second reflective volume holographic grating 17 at the other end opposed to the pupil 13. In this embodiment, the first reflective volume holographic grating 16 has uniform interference fringes over the entire hologram surface. The same design as the first reflective volume holographic grating 16 is applied to the second reflective volume holographic grating 17. The reflective volume holographic gratings 16 and 17 are opposed to each other. One end of the optical surface 14 of the light guide plate 12 is defined as an incident area 14A where image light emitted from the collimating optical system 11 enters, while the other end of the optical surface 14 is defined as an emitting area 14B where the image light exits toward the pupil 13.

[Description of Basic Operations]

Basic operations of the virtual image display 1 will be described. In the virtual image display 1, illumination light emitted from the light source 6 enters the light pipe 7 through the incident surface 9, which makes optical contact with the light source 6 and have a small area, and after repeated total reflection of some rays the illumination light exits the light pipe 7 through the emitting surface 10. The illumination light emitted from the emitting surface 10 is incident upon a diffuser 8 placed next to the light pipe 7. The diffuser 8 adjusts the exit angle and numerical aperture (NA) of the illumination light based on the incident light distribution and emits the adjusted illumination light.

This illumination light illuminates the transmissive spatial light modulator 3. The transmissive spatial light modulator 3 then modulates the illumination light into image light according to, for example, an image to be displayed and emits the image light, for example, or only a P-polarized component from the emitting surface of the modulator 3. The image light enters the collimating optical system 11 that forms it into groups of parallel rays which are different in angle of view (i.e., exit angles of the light emitted from respective pixels of the transmissive spatial light modulator 3) from each other in the XZ plane in FIG. 1. These parallel ray groups, which are made different in angle of view from each other in the YZ plane perpendicular to the XZ plane, enter the light guide plate 12 as shown in FIG. 2. FIG. 1 shows representative parallel rays La, Lb and Lc in the XZ plane, while FIG. 2 shows representative parallel rays LA, LB and LC in the YZ plane.

The right-left (horizontal) direction and the up-down (vertical) direction of the light guide plate 12 in FIG. 1 are defined as X-direction and Y-direction, respectively. In this condition, image light used to display picture images and various types of information is guided within the light guide plate 12 in a lateral direction with respect to the viewer's pupil 13 and then reaches the pupil 13.

This virtual image display 1 can be applied to, for example, a head-mounted display (HMD). In the case of a head-mounted display in which the illumination optical system 2, spatial light modulator 3 and virtual image display optical system 4 are not arranged vertically above the pupil 13, but laterally next to the pupil 13, the head-mounted display can give viewers a good field of view because the laterally arranged optical systems does not block the upper field and lower field of view compared with the case where the optical systems are arranged immediately above the pupil 13.

However, the arrangement tends to necessitate the light to travel a relatively long distance within the light guide plate 12, and therefore the following device may be necessary In the aforementioned arrangement, the image light incident through the incident area 14A into the light guide plate 12 enters the first reflective volume holographic grating 16 placed on one end of the optical surface 15, the end opposite to the incident area 14A. The first reflective volume holographic grating 16 diffracts and reflects the light which in turn travels toward the second reflective volume holographic grating 17 placed on the other end of the optical surface 15 while repeatedly undergoing total internal reflection within the light guide plate 12. Specifically, the parallel rays La to Lc are guided in the Z direction in the XZ plane shown in FIG. 1 while maintaining their parallelity and being totally reflected repeatedly between the optical surfaces 14 and 15 of the light guide plate 12, and travels toward the second reflective volume holographic grating 17 on the other end of the light guide plate 12 in the X-direction. In FIG. 1, the rays La, Lb and Lc are indicated by solid lines, dashed double-dotted lines and dashed lines, respectively.

Due to the reflective volume holographic grating's dispersive ability in which light is diffracted at different diffraction angles according to the angles of view of the light, a small thickness of the light guide plate 12, and a relatively long optical path in which light travels within the light guide plate 12, the number in which the groups of parallel rays are reflected before reaching the second reflective volume holographic grating 17 varies according to the angles of view of the rays as shown in FIG. 1.

More details on the reflection number will be given. Among the groups of parallel rays La, Lb and Lc incident into the light guide plate 12, the group of parallel rays Lc, which enters the light guide plate 12 while inclining toward the second reflective volume holographic grating 17, is reflected a fewer number of times than the groups of parallel rays La and Lb, which enter the light guide plate 12 without inclining so much toward the second reflective volume holographic grating 17, are reflected. The term "group of parallel rays, which enters the light guide plate 12 while inclining toward the second reflective volume holographic grating 17" means a group of parallel rays incident upon the reflection surface of the light guide plate at a large angle. The term "group of parallel rays, which enters the light guide plate 12 without inclining so much toward the second reflective volume holographic grating 17" means a group of parallel rays incident upon the reflection surface of the light guide plate at a small angle. This angle difference is made because each group of the parallel rays La, Lb and Lc incident into the light guide plate 12 has a different angle of view. In short, the parallel ray groups each impinging on the first reflective volume holographic grating 16 at a different incident angle are diffracted at different diffraction angles and totally reflected at different reflection angles, and therefore a difference in number of reflections of the parallel ray groups is set in accordance with the angle of view. It is note that the first reflective volume holographic grating 16 has a hologram surface with interference fringes spaced at equal pitches.

The parallel ray groups each having a different angle of view enter the second reflective volume holographic grating 17 that diffracts and reflects the rays so as to bring the rays out of conditions for total reflection, and then the parallel ray groups are emitted from the emitting area 14B of the light guide plate 12 to enter the viewer's pupil 13. The parallel rays in the light guide plate 12 are not reflected in the Y-direction which is a vertical direction with respect to the pupil 13, more specifically; in the Y-direction substantially perpendicular to planes along the directions in which the parallel rays are reflected and propagated within the light guide plate 12.

Incident rays LA, LB and LC, shown in FIG. 2, each having a different angle of view in the YZ plane are repeatedly reflected within the light guide plate 12 in the Z-direction, but not Y-direction, and arrive at the emitting area 14B of the light guide plate 12.

Figure 3:
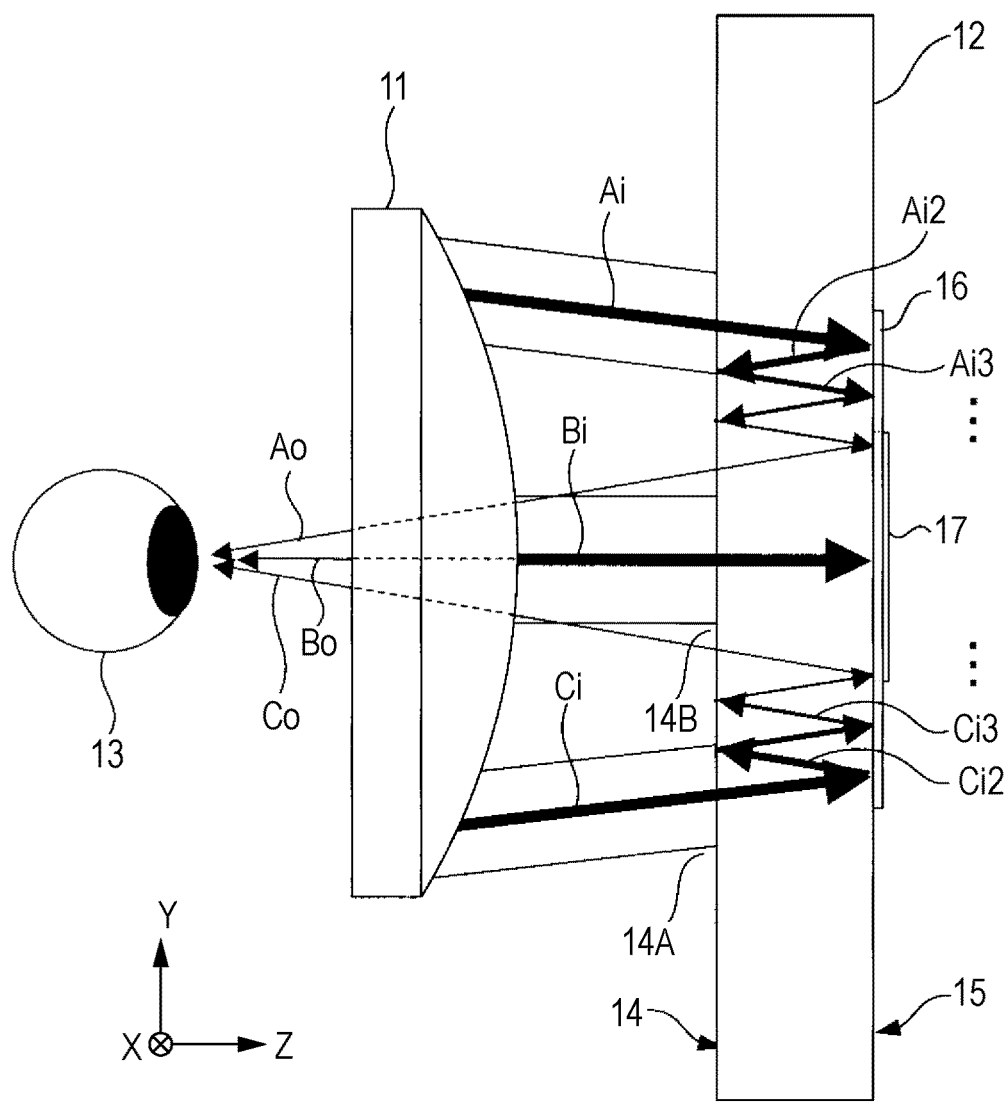
FIG. 3 is a schematic side view of the virtual image display to illustrate the operations thereof.

These behaviors of the light rays will be shown in FIG. 3 corresponding to FIG. 2. As shown in FIG. 3, light emitted from the collimating optical system 11 is converged in the YZ plane, enters the light guide plate 12 through the incident area 14A and travels within the light guide plate 12 in the X-direction (direction orthogonal to the drawing). Travelling directions of representative incident rays emitted from the collimating optical system 11 are indicated by Ai, Bi and Ci, each of which has a different angle of view. These rays travel while being converged in the Y-direction and reflected off the optical surfaces 14 and 15 of the light guide plate 12 as indicated by arrows Ai1, Ai2 ... to Ci1, Ci2 .... Subsequently, the rays are diffracted and reflected by the second reflective volume holographic grating 17 and leave from the emitting area 14B to enter the viewer's pupil 13 as indicated by arrows Ao, Bo and Co.

Since these rays are converged in the Y-direction as described above, the length of the reflection/diffraction surface of the second reflective volume holographic grating 17 in the Y-direction can be set relatively short in comparison with the length of the first reflective volume holographic grating 16.

The difference between the X-direction and Y-direction in the exit angle and numerical aperture of rays emitted from the spatial light modulator 3 will be described with reference to FIGS. 4 and 5. With the assumption that the viewer's pupil 13 is regarded as an exit pupil, the exit angle and numerical aperture NA of image light in the virtual image display 1 using a light guide plate 12 with holograms are determined as follows. The exit angle and numerical aperture NA of the image light from the reflective spatial light modulator 3 are different, for example, between the longer side (X) direction and shorter side (Y) direction of an image display area of the reflective spatial light modulator 3 or vary in accordance with the distance from the center of the image display area.

Figure 4:
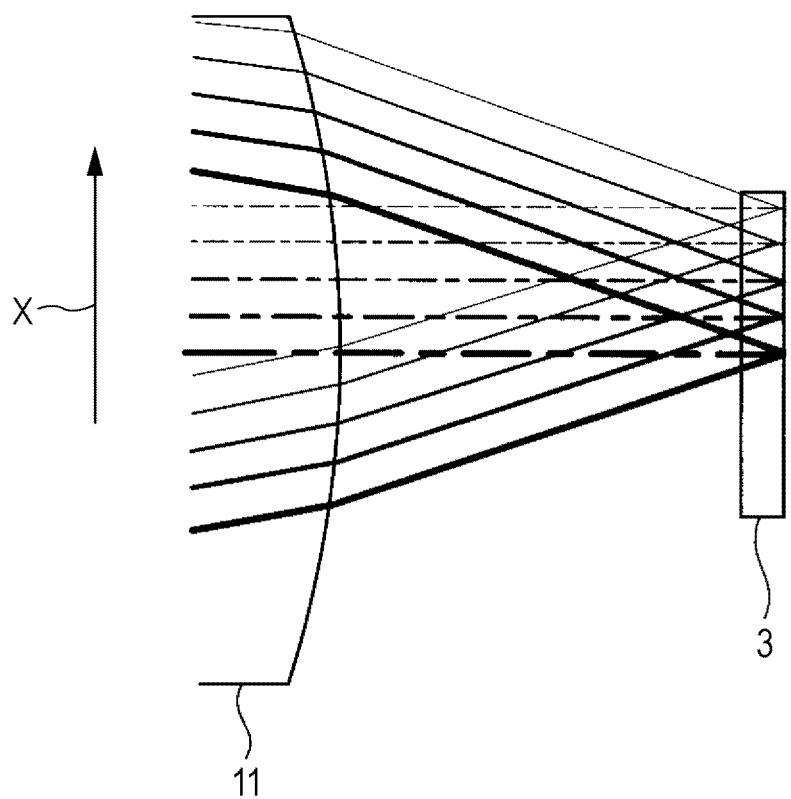
FIG. 4 is a diagram to illustrate the exit angle and numerical aperture, in the X-direction, of light emitted from a spatial light modulator.

Specifically, as shown in FIG. 4, in the X-direction corresponding to the long side direction of the spatial light modulator 3, the chief rays of light emitted from each pixel are substantially normal to the display surface of the spatial light modulator 3, in other words are in a nearly telecentric state, as indicated by dashed dotted lines. In addition, the numerical aperture NA is set relatively large; the reason will be described later.

Figure 5:
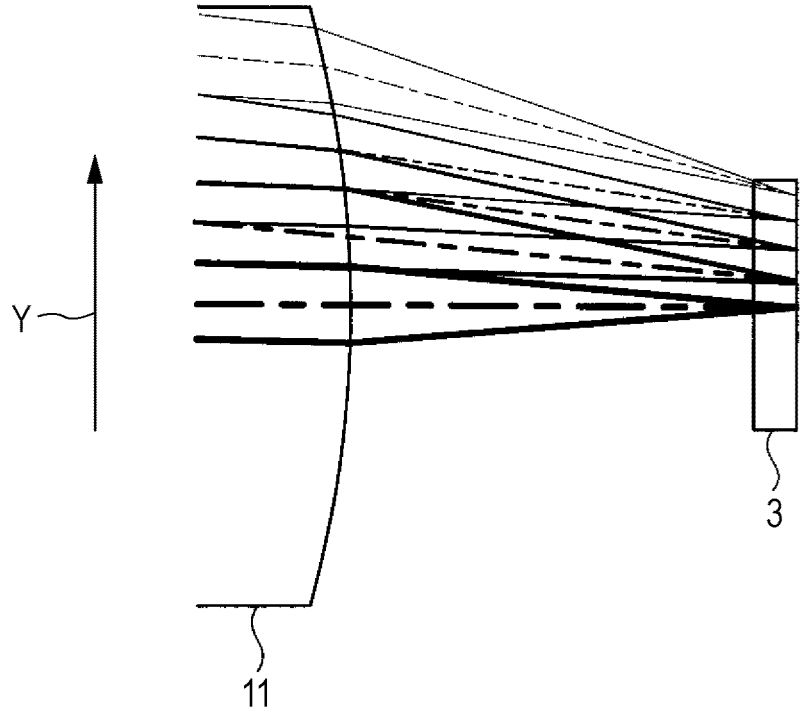
FIG. 5 is a diagram to illustrate the exit angle and numerical aperture, in the Y-direction, of light emitted from the spatial light modulator.

On the other hand, as shown in FIG. 5, in the Y-direction corresponding to the short side direction of the spatial light modulator 3, the chief rays of the light emitted from each pixel becomes less telecentric with the distance the light deviates from the center of the display surface of the spatial light modulator 3. More specifically, the angles formed by the display surface of the spatial light modulator 3 and the chief rays of image display light, indicated by the dashed dotted lines, change away from a right angle, and the numerical aperture NA is set relatively small. The differences in the exit angle between the directions shown in FIGS. 4 and 5 are shown in Table 1 and Table 2, respectively. Each of Table 1 and Table 2 shows chief ray angles, which are angles of a light's optical axis passing through the center of each angle of view, and upper and lower ray angles, which form spread angles of the emission light, those of which are obtained at an image height which is a position from an optical axis.

TABLE 1

| Image Height [mm] | Chief Ray Angle [degree] | Upper Ray Angle [degree] | Lower Ray Angle [degree] |
| --- | --- | --- | --- |
| 0.0 | 0.0 | 20.3 | −20.3 |
| 2.43 | −1.26 | −21.5 | 18.7 |

TABLE 2

| Image Height [mm] | Chief Ray Angle [degree] | Upper Ray Angle [degree] | Lower Ray Angle [degree] |
| --- | --- | --- | --- |
| 0.0 | 0.0 | 4.98 | −4.98 |
| 1.82 | 15.5 | 20.67 | 10.41 |

As appreciated from Tables 1 and 2, the light in the X-direction has a spread angle of approximately ±20 degrees (see Table 1), while the light in the Y-direction has a spread angle of approximately ±5 degrees (see Table 2). In other words, the numerical aperture NA is large in the X-direction, but small in the Y-direction. Consequently, the numerical aperture of the emission light and the exit angle of the chief rays are different between one direction and the other direction with respect to the spatial light modulator 3, i.e., between the X-direction and Y-direction.

Figure 6A:
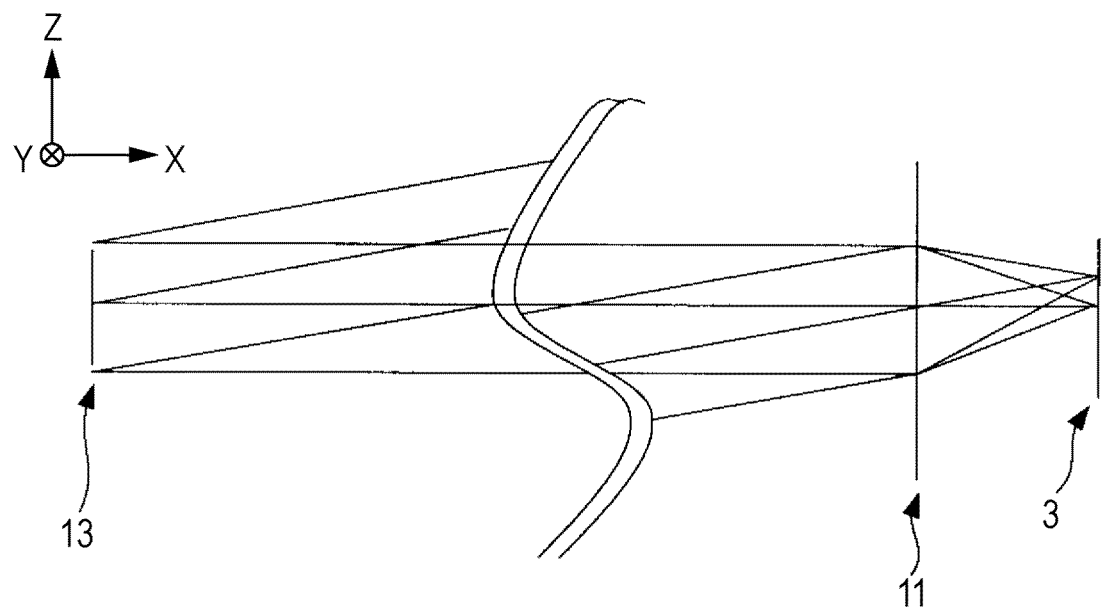

The reason why the virtual image display 1 according to the embodiment can make difference in the numerical aperture NA and exit angle between the X-direction and Y-direction will be described with reference to FIG. 7 in addition to FIGS. 6A and 6B.

As described above with FIG. 1, the number in which rays are reflected within the light guide plate 12 along the traveling direction corresponding to the long side direction (X-direction) of the spatial light modulator 3, in other words, the optical path length in which the rays travel is different depending on the angle of view of the rays. However, as shown in FIG. 6A, the propagating rays are all parallel and travel in groups in such a manner that the groups of rays are folded. Consequently, the difference in the optical path length of the ray groups due to their different angles of view does not cause image distortion because the angles of view of the rays emitted from the light guide plate 12 are invariant. To make it possible, the aperture of the collimating optical system 11 is set relatively small in the X-direction.

Figure 6B:
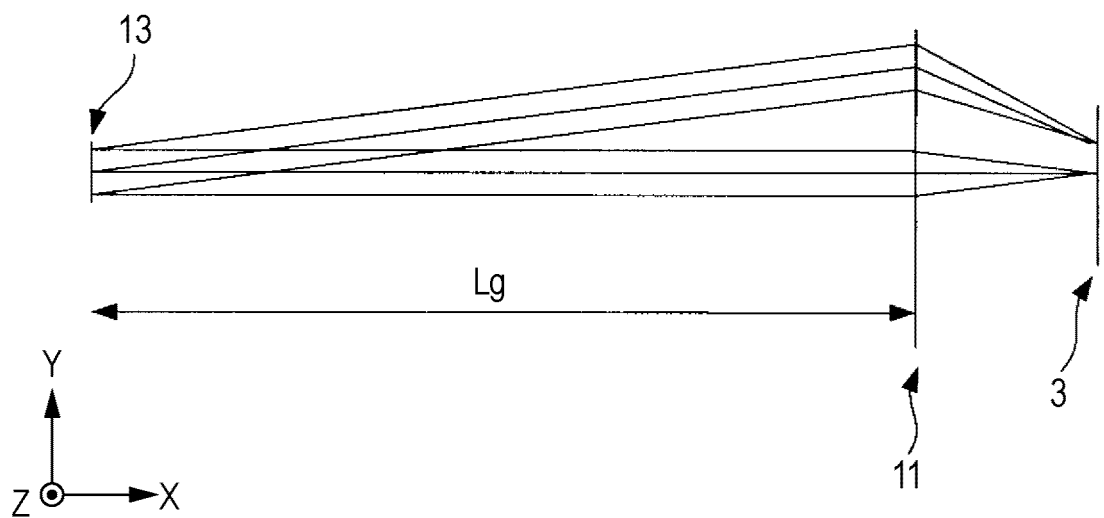
FIG. 6B is a diagram to illustrate the rays from the exit pupil, obtained by the reverse ray trace in the Y-direction.
Figure 7:
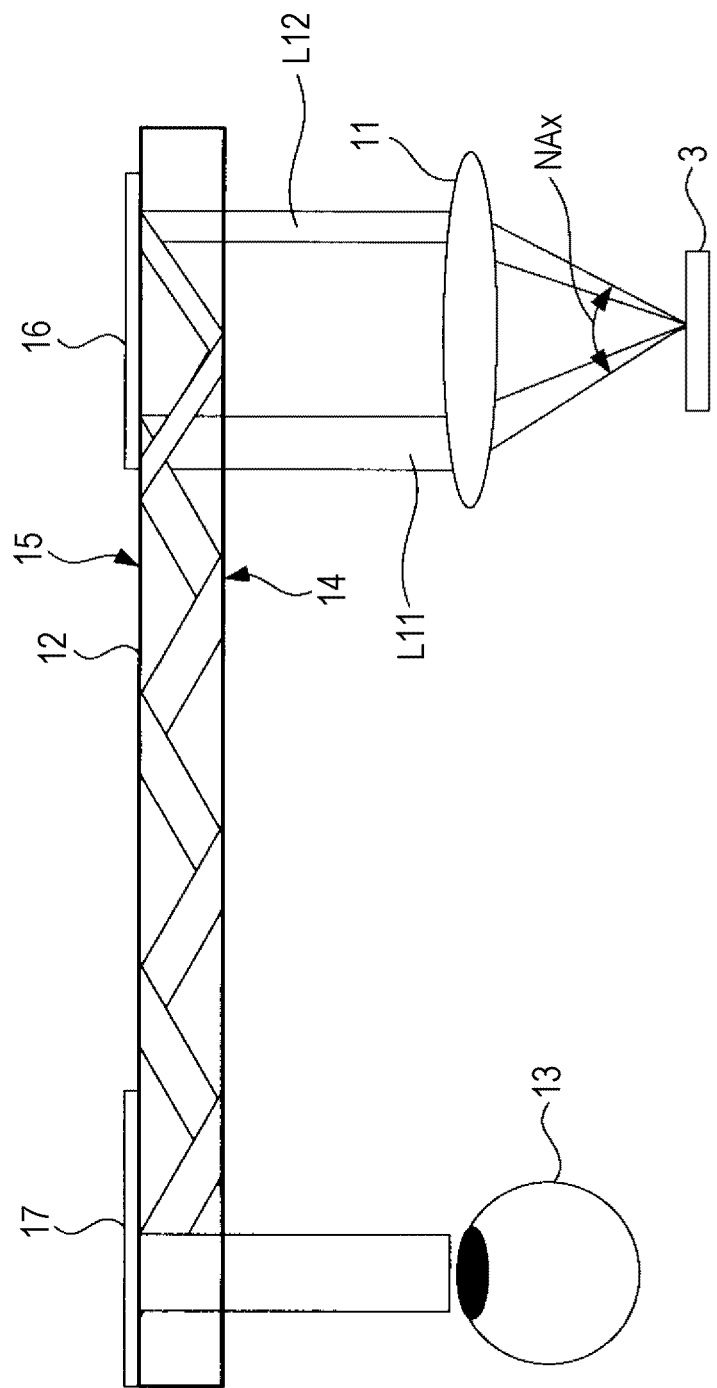
FIG. 7 is a diagram to illustrate the numerical aperture of the virtual image display in the X-direction.

Contrarily, a reverse ray trace performed from an exit pupil apparently shows that, in the short side direction (Y-direction) of the spatial light modulator 3, the vertical angles of view are shifted constantly, as shown in FIG. 6B. When this embodiment is applied to the aforementioned head-mounted display, the optical systems are arranged in the lateral direction with respect to the pupil 13 and therefore the length Lg of the light guide plate 12 may be approximately 60 mm, for example, in consideration of average human head size. Since the image light reflected within the light guide plate 12 in the Y-direction or in the vertical direction results in vertically flipped images, the image light necessarily travels without being reflected in the Y-direction as described above. This greatly spreads the light before reaching the collimating optical system 11, which in turn may necessitate a larger aperture in the Y-direction. In short, the rays are far from being telecentric with respect to the spatial light modulator 3 from the viewpoint of their vertical (Y-direction) angles of view.

By the way, the numerical aperture NAx in the X-direction and NAy in the Y-direction are obtained as follows. First, the numerical aperture NAy in the Y-direction is given by:

$$NAy = D/(2f),$$

where D is the diameter of the viewer's pupil and f is the focal length of the collimating optical system 11.

The numerical aperture NAx in the X-direction may not be obtained simply from the diameter of the pupil, as with the case of Y-direction, because the rays are designed to be folded and reflected within the light guide plate 12 as described above. Specifically, as shown in FIG. 7, the reverse ray trace proves that there are rays that are folded and reflected off an area including the end part of the first reflective volume holographic grating 16 and optical surface 15. More specifically, as appreciated from the reverse ray trace, some rays L11 (i.e., rays reflected off the optical surface 15) are repeatedly reflected and diffracted at the other part of the first reflective volume holographic grating 16, and reach the collimating optical system 11.

The remaining rays L12 diffracted at the end part of the first reflective volume holographic grating 16 directly reach the collimating optical system 11. The rays L11 and L12 belong to a group of parallel rays emitted from the same pixel and having the same angle of view, but are diffracted and reflected at different parts of the first reflective volume holographic grating 16 and merged and propagated in the light guide plate 12.

It is desirable to provide illumination including such divided rays in order to send light to the entire area of the pupil 13; however, dividing light emitted from a pixel into two divergent rays for illumination is not easy. Thus, as shown in FIG. 7, the numerical aperture NAx of the illumination light has to be apparently large.

Therefore, it is understood that in the optical system, the apparent numerical aperture NAx in the X-direction is relatively large, while the numerical aperture NAy in the Y-direction is relatively small.

It is necessary for the virtual image display 1 according to an embodiment to have the optical property of providing anisotropy to the exit angle and numerical aperture of the chief rays, which are emitted from the spatial light modulator 3 to the collimating optical system 11 and correspond to respective pixels, with respect to the X-direction and Y-direction as described above. This optical property is necessary to satisfy the structural conditions, such as the shape of the light guide plate 12 and the traveling behaviors of rays within the light guide plate 12.

[Features of the Present Embodiment]

The virtual image display 1 according to the embodiment possesses such a structure to meet the aforementioned requirement. Concretely, the virtual image display 1 of the embodiment includes a light pipe 7, which is asymmetric between the horizontal and vertical directions, in an illumination optical system 2 opposite to a spatial light modulator 3. This light pipe 7, as described with FIGS. 1 and 2, has an emitting surface 10 whose width d1 in the horizontal direction is set greater than the width d3 of the spatial light modulator 3 in the horizontal direction and whose width d2 in the vertical direction is set smaller than the width d4 of the spatial light modulator 3 in the vertical direction.

Providing such a light pipe 7 to the illumination optical system 2 makes the angular distribution of the illumination light in the horizontal direction uniform across the range to be illuminated and allows the angular distribution of the illumination light in the vertical direction to be spread as wide as necessary for illumination.

Next, the behaviors of rays emitted from the light pipe 7 to efficiently illuminate the spatial light modulator 3 will be described with reference to FIGS. 8 to 15. The angular distribution of the rays satisfies the conditions to be asymmetric as mentioned above.

Figure 8:
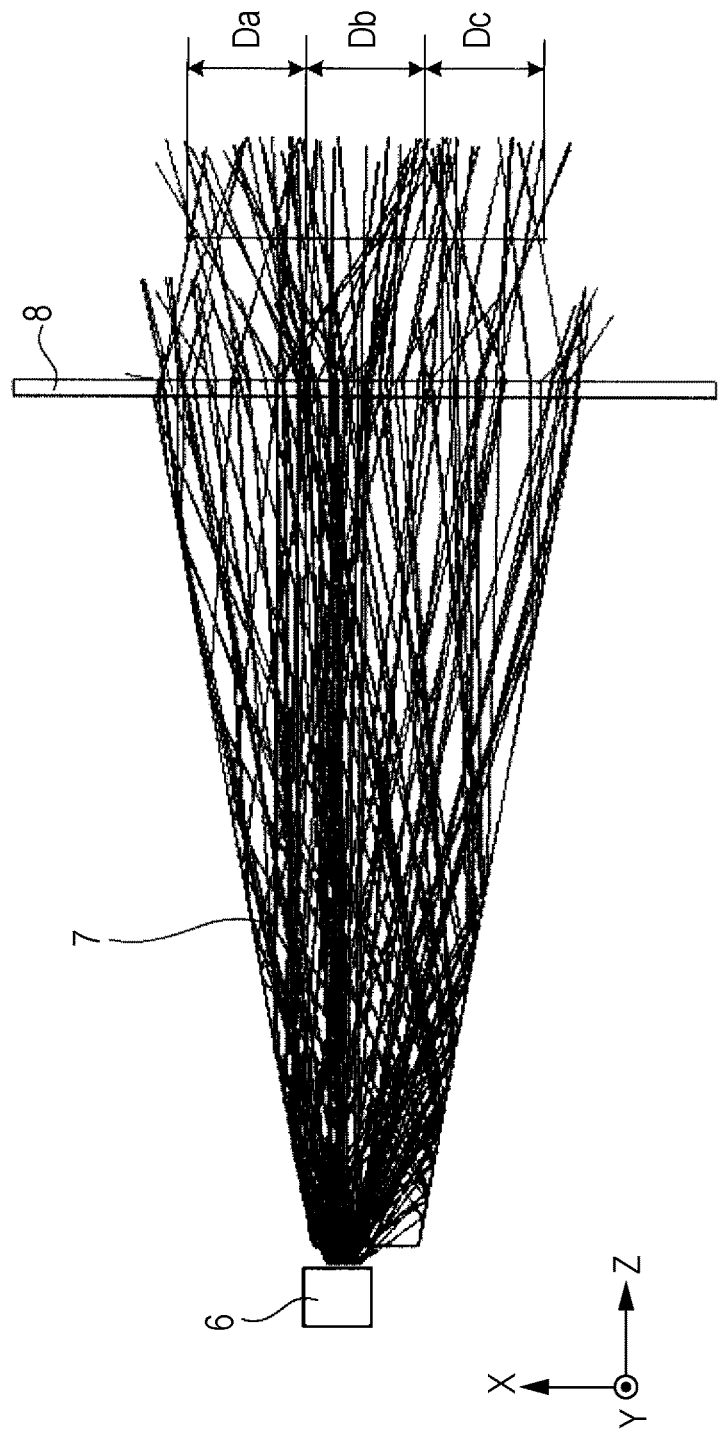
FIG. 8 is a conceptual diagram of a light pipe, in the horizontal direction, of the illumination optical device according to an embodiment.

FIG. 8 illustrates an illumination optical system of the embodiment illuminating a spatial light modulator, or the basic structure of an illumination optical system 2 including a light source 6, light pipe 7 and diffuser 8 in the horizontal direction. The light pipe 7 viewed from the horizontal direction has just a right horizontally-spreading angle and has an emitting surface 10 whose width d1 in the horizontal direction is set greater than the width d3 of the spatial light modulator 3 in the horizontal direction.

With the light pipe 7 having the appropriate spread angle, rays emitted from the light source 6 are distributed onto the spatial light modulator 3 at an almost equal diffusion angle to the spread angle of the light pipe 7. This occurs because the angled inner wall of the light pipe 7 reduces the spread angle of the rays reflected thereon. In addition, the diffusion of the rays by the diffuser 8 makes the angular distribution uniform. The angular distribution of the rays having left the diffuser 8 exhibits an substantially symmetric spread on the spatial light modulator with respect to anywhere around the center of the light pipe 7. However, there are only rays angled to spread from the center at the edge of the light pipe 7, especially in the area off the emitting surface 10 of the light pipe 7.

Figure 10:
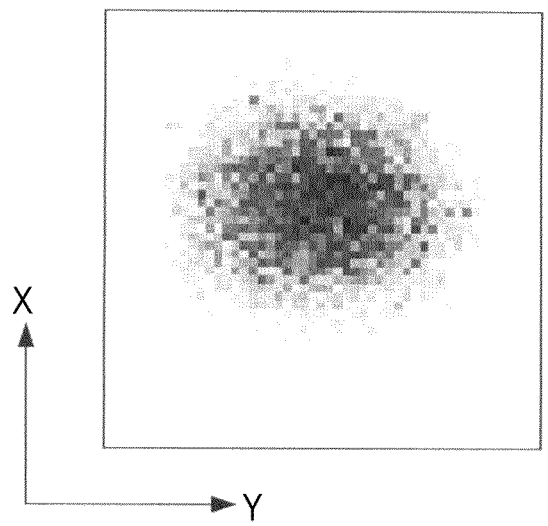
FIG. 10 is an angular distribution diagram of illuminated rays in region Da shown in FIG. 8.
Figure 11:
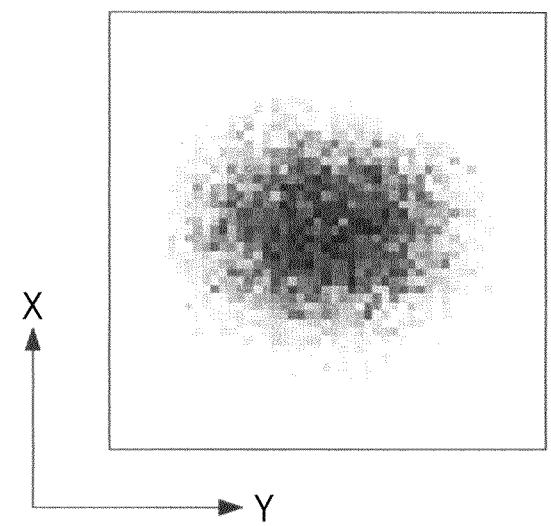
FIG. 11 is an angular distribution diagram of illuminated rays in region Db shown in FIG. 8.
Figure 12:
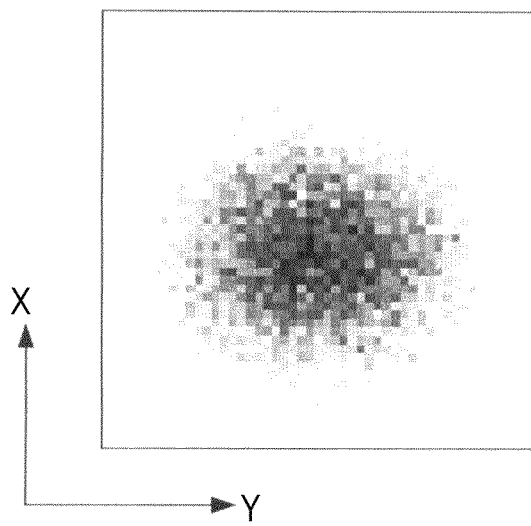
FIG. 12 is an angular distribution diagram of illuminated rays in region Dc shown in FIG. 8.

Making the width d1 of the light pipe 7 in the horizontal direction greater than the width d3 of the spatial light modulator 3 in the horizontal direction and using the rays emitted from around the center of the emitting surface 10 of the light pipe 7 realize a uniform angular distribution of the rays at any image heights within a horizontal angle of view or at any positions on the spatial light modulator 3. FIGS. 10 to 12 show angular distributions of illumination light rays entering regions Da, Db and Dc, shown in FIG. 8, respectively, which are obtained by dividing the spatial light modulator 3 in the horizontal direction into three. The drawings indicate that there is no difference in spreading behaviors of the rays in any regions Da, Db and Dc in the X-direction, and therefore uniform illumination is made.

Figure 9:
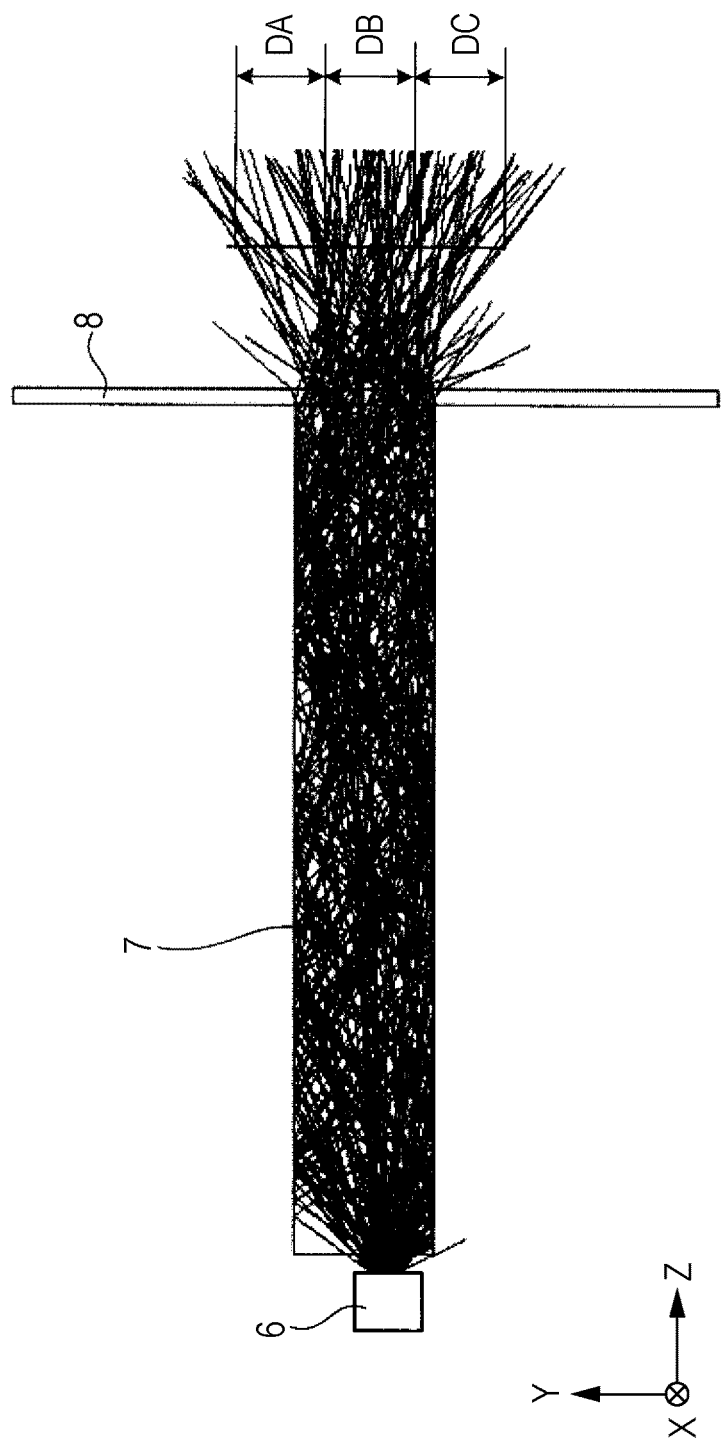
FIG. 9 is a conceptual diagram of a light pipe, in the vertical direction, of the illumination optical device according to an embodiment.

On the other hand, FIG. 9 illustrates the basic structure of the illumination optical system 2 in the vertical direction (Y-direction). The light pipe 7 viewed from the vertical direction has parallel sides or almost parallel but slightly spreading sides, and the width d2 of the emitting surface 10 of the light pipe 7 in the vertical direction is set smaller than the width d4 of the spatial light modulator 3 in the vertical direction.

With the light pipe 7 having such a structure in the vertical direction, rays reflected inside the light pipe 7 do not greatly change their spread angles, and therefore the rays emitted from the light pipe 7 exhibits an angular distribution that is nearly the same as the angular distribution of the rays emitted from the light source 6, in short the rays is emitted with a large spread angle. Due to the large spread angle, the area off the emitting surface 10 of the light pipe 7 receives only the rays spreading from the center, in other words, distributed are rays inclining from the center of the spatial light modulator 3 in the positive Y-direction.

Figure 13:
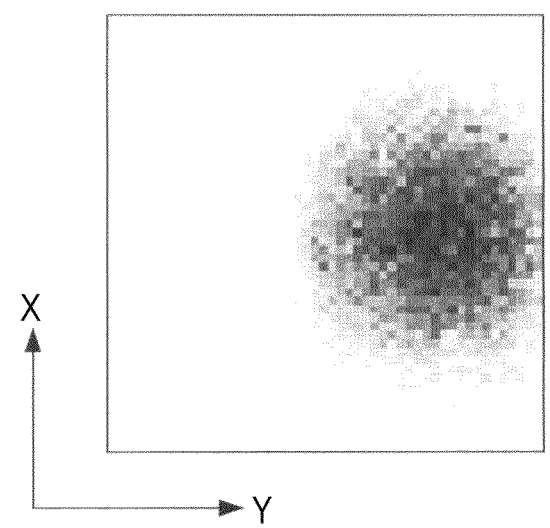
FIG. 13 is an angular distribution diagram of illuminated rays in region DA shown in FIG. 9.
Figure 14:
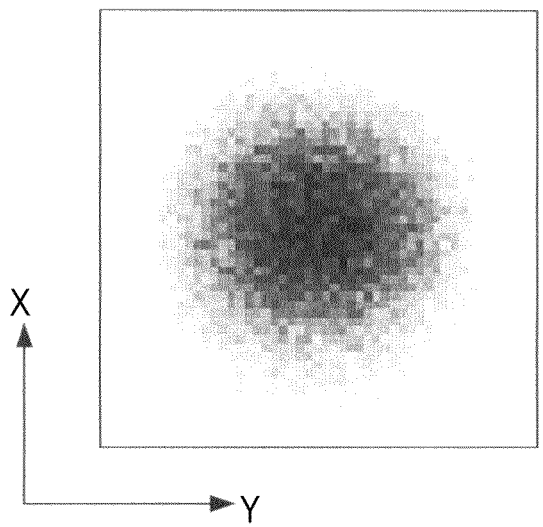
FIG. 14 is an angular distribution diagram of illuminated rays in region DB shown in FIG. 9.
Figure 15:
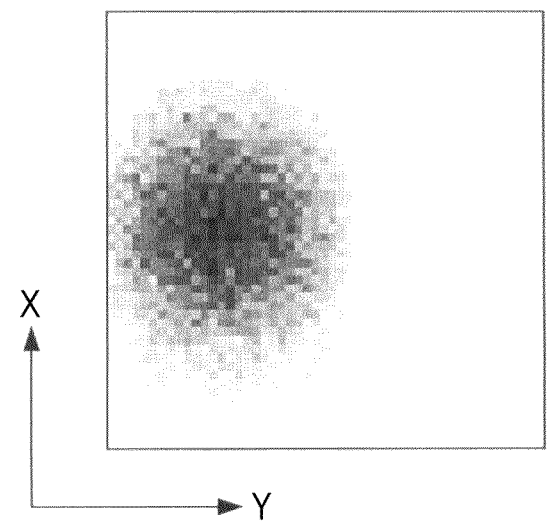
FIG. 15 is an angular distribution diagram of illuminated rays in region DC shown in FIG. 9.

FIGS. 13 to 15 show distributions of light rays illuminating regions DA, DB and DC, shown in FIG. 9, which are obtained by dividing the spatial light modulator 3 in the vertical direction into three. As described above, the angular distribution of the rays in region DA is biased to the positive direction, while the rays are angled to be distributed around the center of region DB, and the angular distribution of the rays in region DC is biased to the negative direction. Making the width d2 of the emitting surface 10 of the light pipe 7 in the vertical direction smaller than the width d4 of the spatial light modulator 3 in the vertical direction provides a distribution in which the rays are angled so as to shift away from the center in proportion to the image height or the position on the spatial light modulator 3.

The illumination optical device 2 and the virtual image display 1 using the illumination optical device 2 as an illumination optical system according to the embodiment can produce asymmetric illumination light that is anisotropic between the horizontal direction and vertical direction and therefore can efficiently illuminate the spatial light modulator 3 without reduction of peripheral brightness. In addition, the absence of lenses can cut down on costs for manufacturing the illumination optical device 2 and the virtual image display 1.

The light pipe 7 can be, for example, an optical waveguide made of a plastic material. Such a plastic light pipe 7 can be manufactured readily. The light pipe 7 can be also a hollow optical waveguide, for example, made by bonding four glass plates which provide four reflection surfaces. Such a hollow optical waveguide has more advantages than a solid prismatic light pipe. The solid pipe (i.e., prismetic pipe) should be long from the incident surface 9 opposed to the light source (e.g., LED) 6 to the emitting surface 10 opposed to the diffuser 8 because the reflection angle of light reflected inside the solid pipe decreases according to the refractive index of the solid pipe material. On the contrary, the optical system with the hollow light pipe can be made small.

Figure 16A:
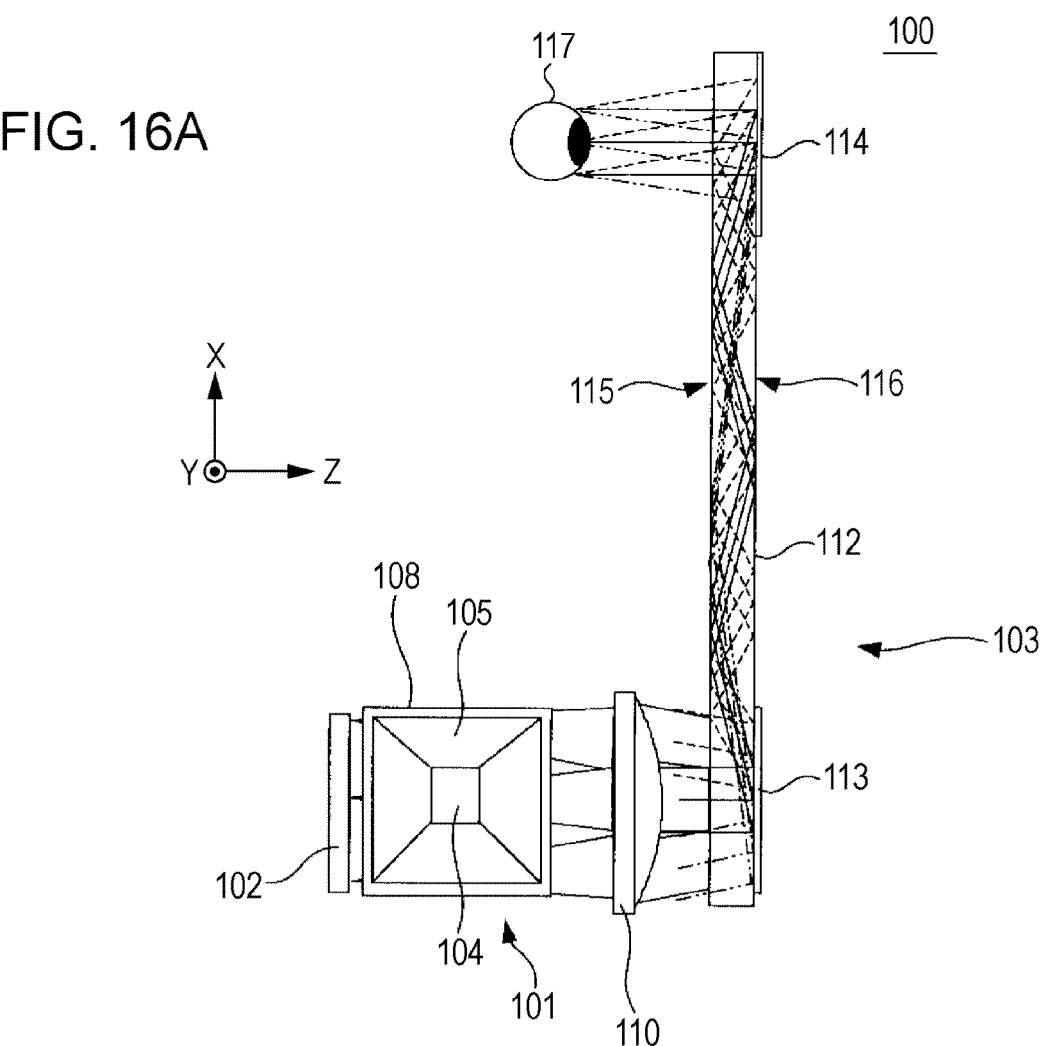
FIGS. 16A and 16B are a schematic plan view and a schematic side view, respectively, showing an example of a related virtual image display.
Figure 16B:
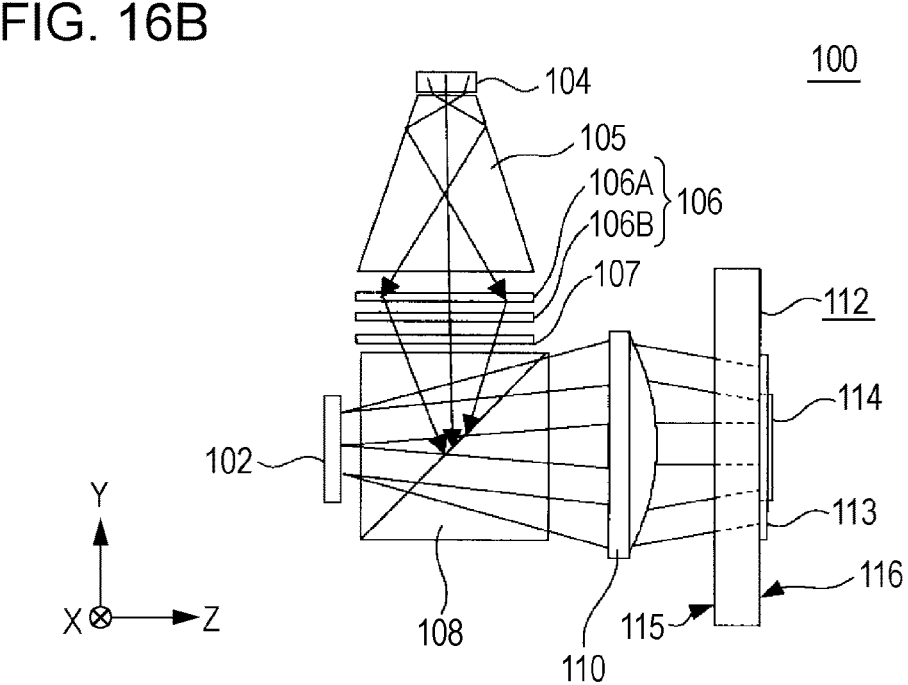

Although, in the aforementioned embodiment, the illumination optical device 2 according to the present application is applied as an illumination optical system in the virtual image display 1 having the transmissive spatial light modulator 3, the illumination optical device 2 can be applied as an illumination optical system used to illuminate a spatial light modulator in other types of image displays. Furthermore, the light pipe 7 used in the illumination optical device according to the embodiment can be applied to an illumination optical system in a virtual image display having a reflective spatial light modulator shown in FIG. 16.

The head-mounted display using the virtual image display according to the embodiment includes a glasses-type display.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An illumination optical device comprising:
    a light source;
    a light pipe consisting of a single light pipe configured to guide illumination light from said light source, the light pipe having an emitting surface, the emitting surface having:
        (a) a light emitting surface height;
        (b) a light emitting surface width;
    a diffuser arranged on an emitting surface side of said light pipe; and
    an illuminated object including an illuminated object surface facing the emitting surface and having:
        (a) an illuminated object surface height in a direction corresponding to the light emitting surface height; and
        (b) an illuminated object surface width in a direction corresponding to the light emitting surface width,
    wherein: the light emitting surface height is set greater than the illuminated object surface height, and the light emitting surface width is set smaller than illuminated object surface width.

2. The illumination optical device according to claim 1, wherein a space is provided between said diffuser and said illuminated object.

3. The illumination optical device according to claim 2, wherein said illuminated object is a spatial light modulator.

4. A virtual image display comprising:
    a light source;
    a light pipe consisting of a single light pipe guiding illumination light from said light source, the light pipe having an emitting surface, the emitting surface having:
        (a) a light emitting surface height; and
        (b) a light emitting surface width;
    a diffuser arranged on an emitting surface side of said light pipe; and
    a spatial light modulator modulating the illumination light incident from said diffuser according to an image to produce image light, the spatial light modulator having:
        (a) an illuminated spatial light modulator surface facing the emitting surface and having a spatial light modulator surface height in a direction corresponding to the light emitting surface height;
        (b) and a spatial light modulator surface width in a direction corresponding to the light emitting surface width;
    a collimating optical system converting the image light from said spatial light modulator into groups of parallel rays and emitting the groups of parallel rays; and
    a light guide plate in which said groups of parallel rays enter and are propagated while repeatedly undergoing total internal reflection, wherein the light emitting surface height is set greater than the spatial light modulator surface height, and the light emitting surface width is set smaller than the spatial light modulator surface width.

5. The virtual image display according to claim 4, wherein a space is provided between said diffuser and said spatial light modulator.

6. The virtual image display according to claim 5, wherein said light guide plate includes:
- a first reflective volume holographic grating arranged on one end thereof, the end being opposite to said collimating optical system; and
- a second reflective volume holographic grating arranged on the other end thereof, the end being opposite to a pupil of a viewer.

7. The virtual image display according to claim 4, wherein said spatial light modulator is a transmissive liquid crystal panel.

8. The illumination optical device according to claim 1, wherein the light pipe is configured so that the cross-sectional area thereof increases from a light incident surface adjacent to the light source toward the emitting surface.

9. The illumination optical device according to claim 1, wherein the diffuser is configured to diffuse the incident rays so as to spread from the center of the incident rays to exhibit a Gaussian distribution, and is configured to adjust an exit angle and numerical aperture based on an incident light distribution.

10. The illumination optical device according to claim 1, wherein the diffuser is the same in size and shape as the emitting surface of the light pipe.

11. The illumination optical device according to claim 1, wherein the diffuser and illuminated object are configured and arranged such that a surface of the diffuser is coplanar with the illuminated object surface.

12. The virtual image display according to claim 5, wherein each group of the parallel rays have a different angle of view.

13. The virtual image display according to claim 6, wherein the first and second reflective volume holographic gratings have uniform interference fringes over entire hologram surfaces thereof.

* * * * *